US008937675B2

(12) United States Patent
Noori et al.

(10) Patent No.: US 8,937,675 B2
(45) Date of Patent: Jan. 20, 2015

(54) SIMULATED INCIDENT LIGHT METER ON A MOBILE DEVICE FOR PHOTOGRAPHY/CINEMATOGRAPHY

(75) Inventors: Rouzbeh Noori, Waterloo (CA); Andrew Kenneth Michael Wooster, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 841 days.

(21) Appl. No.: 13/035,131

(22) Filed: Feb. 25, 2011

(65) Prior Publication Data

US 2012/0218452 A1    Aug. 30, 2012

(51) Int. Cl.
*H04N 5/222* (2006.01)
*H04M 1/725* (2006.01)

(52) U.S. Cl.
CPC ...... *H04M 1/72522* (2013.01); *H04M 2250/52* (2013.01); *H04M 2250/12* (2013.01)
USPC .................................................. 348/333.02

(58) Field of Classification Search
USPC .................................................. 348/333.02
See application file for complete search history.

(56) References Cited

U.S. PATENT DOCUMENTS

| 5,589,934 | A | 12/1996 | Hosoi et al. |
| 2008/0165115 | A1 | 7/2008 | Herz et al. |
| 2008/0303922 | A1 | 12/2008 | Chaudhri et al. |
| 2009/0005005 | A1 * | 1/2009 | Forstall et al. ............... 455/411 |
| 2009/0084943 | A1 * | 4/2009 | Solhusvik et al. ...... 250/214 AL |
| 2011/0205397 | A1 * | 8/2011 | Hahn et al. ................ 348/231.6 |

FOREIGN PATENT DOCUMENTS

| EP | 1696414 A1 | 8/2006 |
| EP | 2200306 A2 | 6/2010 |
| TW | 1261460 B | 9/2006 |
| WO | 2009101487 A1 | 8/2009 |

OTHER PUBLICATIONS

Canadian Office Action; Application No. 2,769,367; Jul. 22, 2013; 2 pages.
European Extended Search Report; Application No. 11156086.8; Aug. 12, 2011; 9 pages.
Camera Metering & Exposure; Understanding Camera Metering and Exposure; http://www.cambridgeincolour.com/tutorials/camera-metering.htm; 4 pgs, Oct. 27, 2005.
Reichmann, Michael; Sekonic L508 II Zoom Master Light Meter; http://www.luminous-landscape.com/tutorials/meters.shtml; 4 pgs, May 2011.

(Continued)

*Primary Examiner* — James Hannett
(74) *Attorney, Agent, or Firm* — Conley Rose, P.C.; J. Robert Brown, Jr.

(57) ABSTRACT

A mobile telecommunications device is provided. The mobile telecommunications device comprises a light sensor and a calculation component. Adjustments to at least one of the brightness of a display screen on the mobile telecommunications device and the backlighting of a keypad on the mobile telecommunications device are based on light sensed by the light sensor. The calculation component is configured to receive a light level measurement from the light sensor and generate a photography-related output based on the light level measurement.

17 Claims, 3 Drawing Sheets

(56) References Cited

OTHER PUBLICATIONS

Wikipedia; Light Meter; http://en.wikipedia.org/wiki/Light_meter; 8 pgs, May 18, 2004.

Ace Camera the International Photography Magazine; The Tool for Better Exposures: How to Use an 18% Gray Card; http://www.acecam.com/magazine/gray-card.html; Feb. 17, 2000; 3 pgs.

Canadian Office Action; Application No. 2,769,367; May 8, 2014; 4 pages.

Kaisoft/Pocketkai; "Kai's Luxmeter for HTC/Omnia 2.1"; http://www.mobiletopsoft.com/pocket-pc/download-kais-luxmeter-for-htcomnia-2-1.html; Dec. 11, 2009; 9 pages.

EP Examination Report; Application No. 11156086.8; Oct. 1, 2014; 8 pages.

* cited by examiner

SIMULATED INCIDENT LIGHT METER ON A MOBILE DEVICE FOR PHOTOGRAPHY/CINEMATOGRAPHY

BACKGROUND

The quality of a photograph or film often depends on accurate settings for a camera's exposure-related parameters, such as aperture settings and/or exposure times. Any settings related to exposure parameters for photographs or films will hereinafter be referred to as exposure settings. Also, the terms "photograph", "photographer", "photography", and the like will be used generically hereinafter to refer to concepts related to photography and/or cinematography.

To determine the appropriate exposure settings for a photograph, the lighting conditions under which the photograph is taken might need to be determined. A photographer might use one of two different types of light meters, a reflected light meter or an incident light meter, to measure the light level. A reflected light meter is typically built in to a camera and can measure the amount of light reflected from a subject and arriving at the camera. An incident light meter is typically a stand-alone device that can measure the amount of light falling on a subject.

In most cases, a measurement by a reflected light meter is adequate for determining the appropriate exposure settings. However, when a scene is particularly bright or particularly dark, the use of a reflected light meter can result in a photograph that is underexposed or overexposed. An incident light meter might provide better results under exceptionally bright or dark conditions. A photographer can place an incident light meter near the subject to be photographed to measure the amount of light actually incident on the subject. This light measurement might then be used to determine exposure settings that are more appropriate than those that would be obtained through the use of a reflected light meter.

It can be seen that reflected light meters and incident light meters each have advantages and disadvantages. A reflected light meter can be built in to a camera, thus freeing the photographer from the need to carry an additional piece of equipment. A camera with a built-in reflected light meter can use the light level measurements made by the reflected light meter to make an automated determination of the appropriate exposure settings. However, the light level measurements made by a reflected light meter might not always lead to the most appropriate exposure settings under all circumstances.

An incident light meter, on the other hand, can take light level measurements that result in exposure settings that are correct under a broader range of lighting conditions. However, a photographer using an incident light meter typically needs to carry an additional piece of equipment and may need to manually determine the exposure settings based on the measurements made by the incident light meter.

Digital cameras are sometimes included in multi-function devices such as telephones, smart phones, personal digital assistants, handheld, tablet, or laptop computers, and similar portable devices that have wireless telecommunications capabilities. Any such device will hereinafter be referred to as a mobile telecommunications device or simply as a mobile device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative examples of one or more implementations of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Implementations of the present disclosure allow a mobile telecommunications device with a light sensor to function as an incident light meter. The light level measurements made by the light sensor can then be used to compute exposure settings. Using a mobile device in this manner can eliminate the need for photographers to carry a separate device to take light level readings.

Many mobile devices are equipped with light sensors in order to measure the ambient light level. A mobile device might use the measurements made by such a sensor to adjust the brightness of its display screen and/or the backlighting of its keypad as appropriate for the illumination in its surroundings. Implementations of the present disclosure use light level measurements from the light sensor on a mobile device to generate a light level value that can be used for photography purposes.

Figure 1:
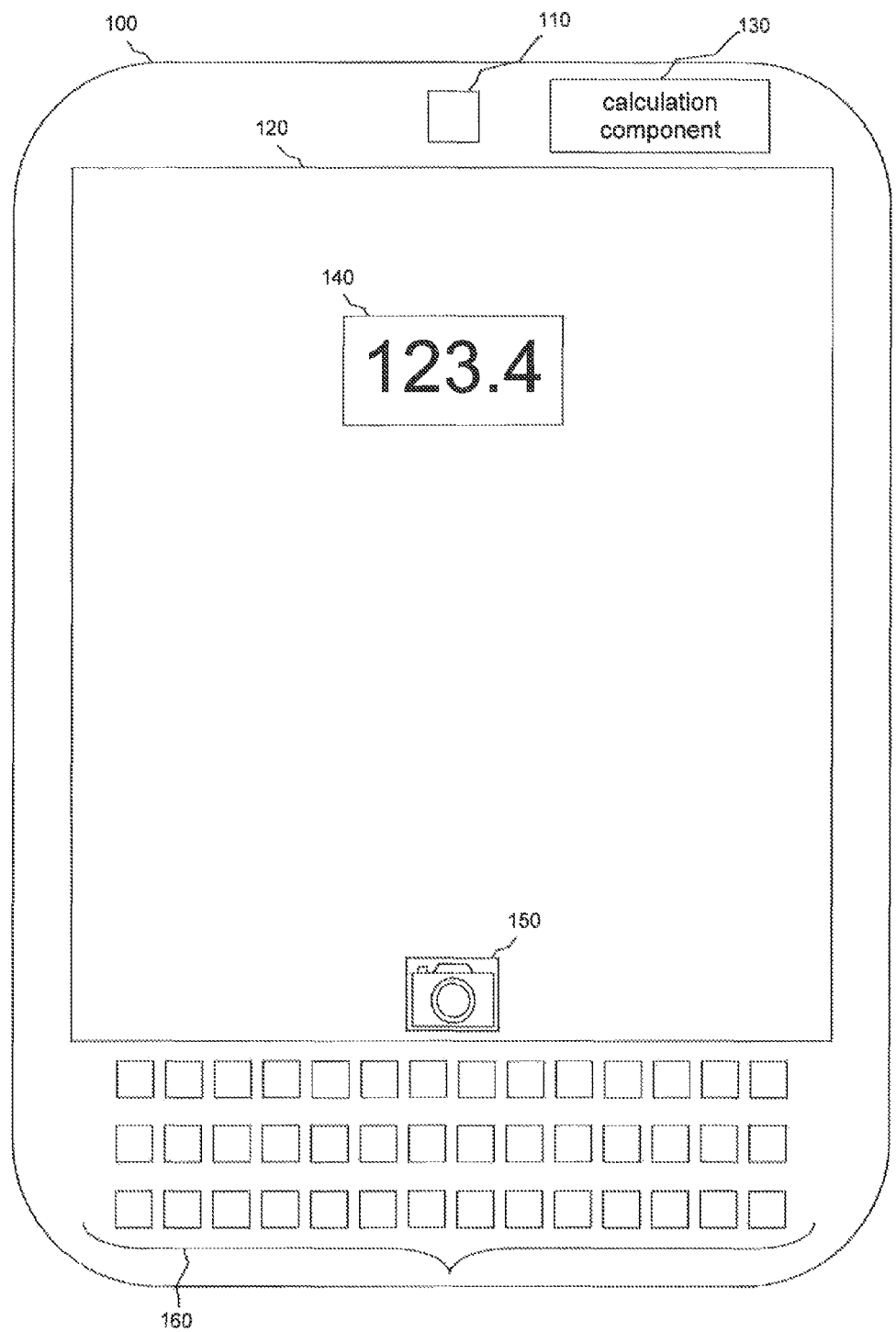
FIG. 1 illustrates a mobile device that can be used as an incident light meter, according to an implementation of the disclosure.

FIG. 1 illustrates an implementation of a mobile device 100 that includes a light sensor 110. The light sensor 110 is depicted at the top of the front side of the mobile device 100, but in other implementations the light sensor 110 could be in other locations on the mobile device 100. In some implementations, the light sensor 110 measures ambient light levels and causes the brightness of a display screen 120 on the mobile device 100 to be adjusted accordingly. Alternatively or additionally, the ambient light levels measured by the light sensor 110 might be used to adjust the backlighting on a keypad 160 on the mobile device 100. In other implementations, the light sensor 110 might measure light levels for other purposes.

In an implementation, the light level measurements made by the light sensor 110 are used as inputs into a calculation component 130 on the mobile device 100. While the calculation component 130 is depicted on the surface of the mobile device 100, it should be understood that the calculation component 130 would typically be an internal component of the mobile device 100 and could be any combination of hardware or software components capable of performing the actions described herein. After receiving an input from the light sensor 110, the calculation component 130 can generate a photography-related output.

In some implementations, the photography-related output generated by the calculation component 130 is a light level value that the calculation component 130 provides for display on a portion 140 of the display screen 120 of the mobile device 100. That is, the calculation component 130 converts the light level measurements made by the light sensor 110 into units, such as lux, that are typically used in photography. A light level value in the appropriate units is then displayed in the portion 140 of the display screen 120. A photographer could use a reading shown in the portion 140 of the display screen 120 to adjust the exposure settings for another camera. Alternatively, the calculation component 130 could automatically calculate one or more exposure setting values based on the measured light level, and the exposure setting values could be displayed on the portion 140 of the display screen 120 instead of or in addition to a light level value.

To cause a light level value and/or an exposure setting value to appear in the portion 140 of the display screen 120, the photographer might press a photography-related virtual button 150 on the display screen 120, might press a key on the keypad 160, might select a menu item that appears on the display screen 120, or might provide some other input that causes the light level value and/or exposure setting value to appear. In the implementations where a light level value and/or an exposure setting value appears in the portion 140 of the display screen 120, the mobile device 100 can function similarly to a traditional incident light meter. That is, the photographer can hold the mobile device 100 near a subject, take an incident light level measurement, observe the displayed light level value and/or exposure setting value, and use the displayed value to adjust the exposure settings on another device.

In other implementations, the photography-related output generated by the calculation component 130 is an automated adjustment of an exposure setting for a camera on the mobile device 100. That is, light level measurements from the light sensor 110 are provided to the calculation component 130, and the calculation component 130 uses the light level measurements to determine appropriate exposure settings for a photograph to be taken by the mobile device 100. The calculation component 130 might then initiate an automated adjustment of the exposure parameters for the photograph. A light level value and/or exposure setting value is not necessarily displayed on the display screen 120 of the mobile device 100 when an automated exposure setting adjustment is made on the mobile device 100 based on the light level measurements from the light sensor 110.

In still other implementations, a light level value displayed in the portion 140 of the display screen 120 might be used by a photographer to manually set the exposure parameters for a photograph that is to be taken by the mobile device 100. Alternatively, a light level value or exposure setting value might appear in the portion 140 of the display screen 120 for information purposes even when the exposure settings for the mobile device 100 are automatically adjusted.

Exposure setting adjustments on the mobile device 100 that are based on incident light level measurements could be performed instead of or in combination with automated adjustments that are made based on a reflected light meter built in to the mobile device 100. For instance, a photographer might use an incident light level value or exposure setting value shown in the portion 140 of the display screen 120 to manually fine tune an exposure setting automatically determined by the mobile device's reflected light meter. Alternatively, a photographer might override the exposure settings that were automatically set based on the reflected light meter measurements and might instead use an incident light level value or exposure setting value shown in the portion 140 of the display screen 120 to establish new exposure parameter settings for the mobile device 100.

In an implementation, the Java level application programming interface (API) LightSensorGetLastKnownAdcReading can be used to retrieve light level measurements from the light sensor 110. In other implementations, the measurements could be retrieved in other ways. These measurements can then be used as inputs into the calculation component 130 to calculate a light level and/or an exposure setting.

In an implementation, settings for one or more other variables can be manually entered into the mobile device 100 by the photographer and used together with the automatically generated light level measurements from the light sensor 110 to calculate an exposure setting. The other user input variables might be similar to the user input variables that are typically entered into traditional incident light meters. One such variable might be the number of frames per second that the camera is set to expose. Another such variable might be the sensitivity level of the film, typically referred to as ISO. Yet another such variable might be the shutter angle in degrees. Still another such variable might be the lighting type.

In an implementation, the lighting type variable takes one of three values: daylight, tungsten, or fluorescent. The lighting type might need to be manually specified because the photoptic response accuracy (ft value) of the light sensor 110 on the mobile device 100 might be different from that of traditional incident light meters. Specification of the type of lighting the light sensor is exposed to might compensate for this difference. In an implementation, the user selects the type of lighting and manually enters the selection into the mobile device 100. A correction to the automatically generated exposure settings can then be made based on the lighting type, since the error associated with a particular lighting type tends to be constant.

Figure 2:
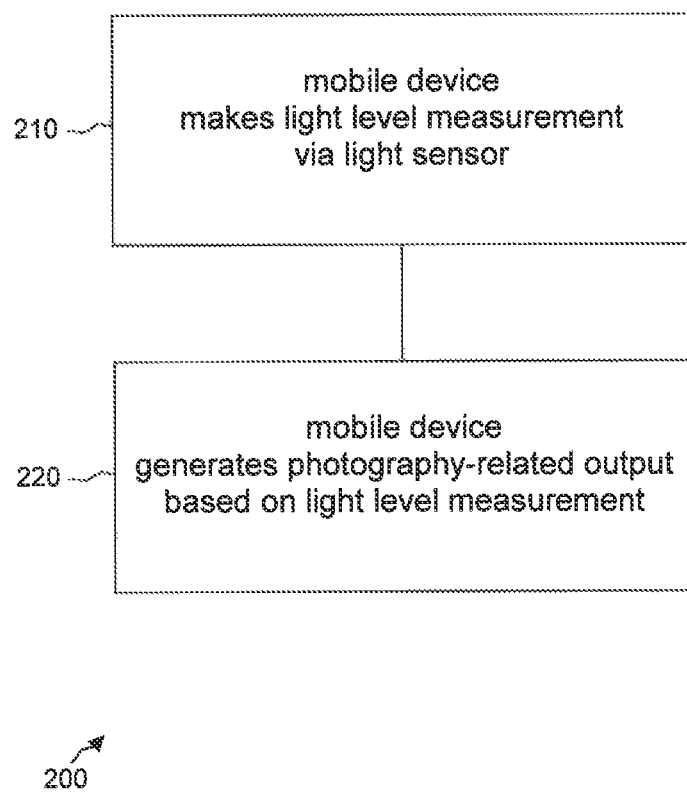
FIG. 2 is a flowchart for a method for a mobile device to simulate an incident light meter, according to an implementation of the disclosure.

FIG. 2 illustrates an implementation of a method 200 for a mobile device to simulate an incident light meter. At block 210, the mobile device makes a light level measurement via a light sensor. At block 220, the mobile device generates a photography-related output based on the light level measurement.

Light meter applications that currently exist for mobile devices are different from the implementations disclosed herein in that the existing applications do not use a light sensor on the device. Instead, they use information provided by the camera lens. Some advanced mobile devices are equipped with auto-exposure and auto-focus cameras, wherein a half-click of the shutter button initiates a measurement of the amount of light hitting the camera lens and an exposure setting is automatically calculated. This calculation, however, determines an average illumination for the scene, which is what a reflected light meter does. Therefore, such devices do not function as incident light meters as do the mobile devices described herein.

In other words, a mobile device equipped with a camera with an automated exposure feature might include a light sensor or some other type of light detection component that is separate from the light sensor 110 described above. This separate light sensor can provide the camera with at least a portion of the functionality of a reflected light meter but does not generate an output that can provide the camera with the functionality of an incident light meter.

Figure 3:
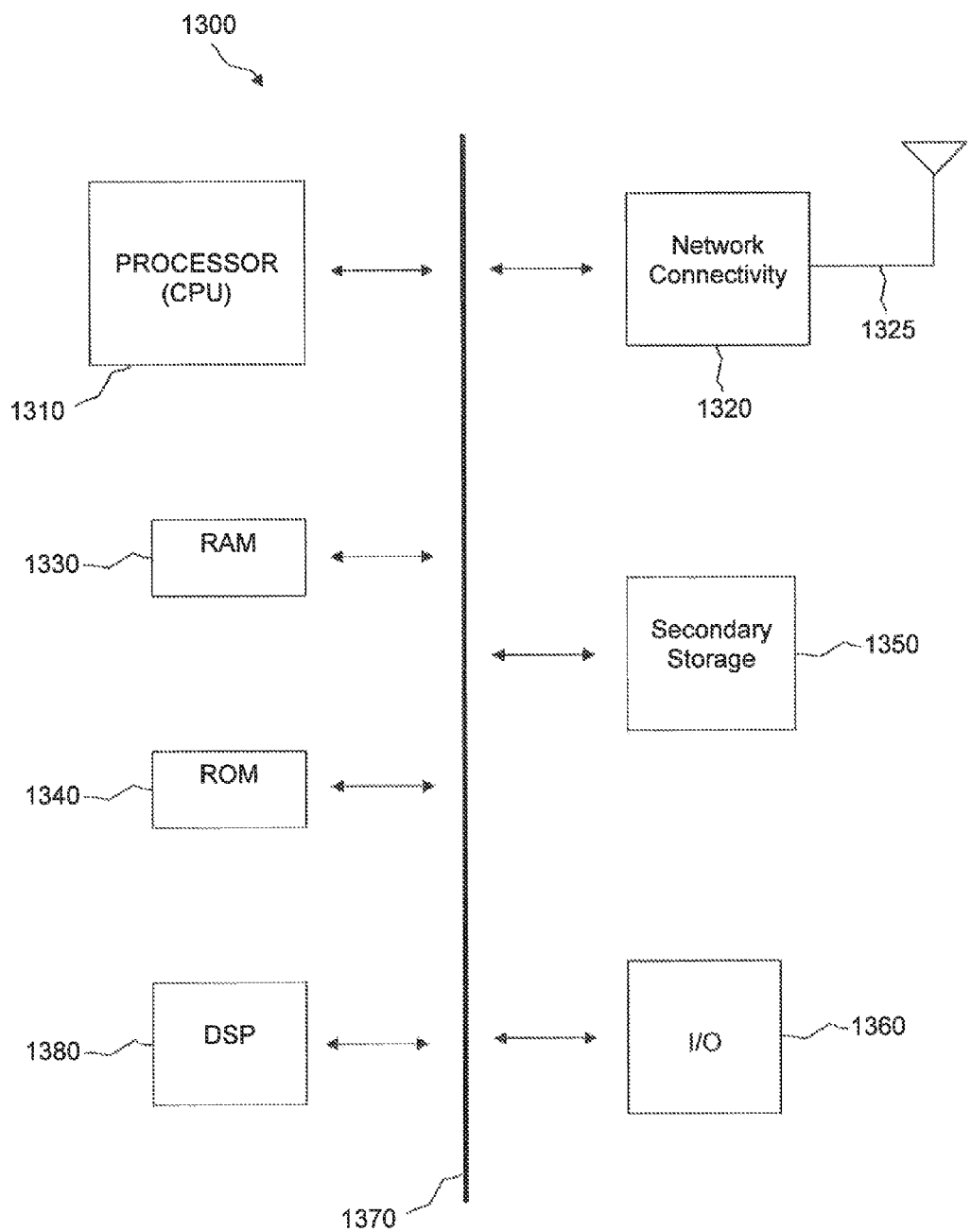
FIG. 3 illustrates a processor and related components suitable for implementing the present disclosure.

The components described above might include or be implemented by a processing component that is capable of executing instructions related to the actions described above. FIG. 3 illustrates an example of a system 1300 that includes a processing component 1310 suitable for one or more of the implementations disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, digital subscriber line (xDSL) devices, data over cable service interface specification (DOCSIS) modems, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver component 1325 may include data that has been processed by the processor 1310 or instructions that are to be executed by processor 1310. The data may be ordered according to different sequences as may be desirable for either processing or generating the data or transmitting or receiving the data.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

In an implementation, a mobile telecommunications device is provided. The mobile telecommunications device comprises a light sensor and a calculation component. Adjustments to at least one of the brightness of a display screen on the mobile telecommunications device and the backlighting of a keypad on the mobile telecommunications device are based on light sensed by the light sensor. The calculation component is configured to receive a light level measurement from the light sensor and generate a photography-related output based on the light level measurement.

In another implementation, a method is provided. The method comprises a mobile device making a light level measurement via a light sensor and the mobile device simulating an incident light meter by generating a photography-related output based on the light level measurement.

While several implementations have been provided in the present disclosure, it should be understood that the disclosed systems and methods may be implemented in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile telecommunications device, comprising:
    a camera including a first light sensor configured to measure an amount of light reflected from a subject;
    a second light sensor different from the first light sensor of the camera, the second light sensor configured to measure an amount of light incident on a subject as a light level measurement; and
    a calculation component configured to receive a light level measurement from the second light sensor and generate a photography-related output based on the light level measurement, wherein the photography-related output is automatically applied to the camera to adjust an exposure setting, wherein the photography-related output is used for overriding an exposure setting automatically determined by the calculation component based on the amount of light reflected from the subject as measured by the first light sensor.

2. The mobile telecommunications device of claim 1, wherein the photography-related output is displayed on a display screen of the mobile telecommunications device and is at least one of:
- a light level value displayed in a unit appropriate for photography; and
- an exposure setting.

3. The mobile telecommunications device of claim 1, wherein light level measurements made by the second light sensor are retrieved from the light sensor using a Java level application programming interface.

4. The mobile telecommunications device of claim 1, wherein the photography-related output is an exposure setting that is calculated based on the light level measurement and on at least one additional input that is manually entered into the mobile telecommunications device and that is a setting for at least one of:
- a number of frames per second;
- a film sensitivity level;
- a shutter angle; and
- a lighting type.

5. The mobile telecommunications device of claim 4, wherein the lighting type is one of:
- daylight;
- tungsten; and
- fluorescent.

6. The mobile telecommunications device of claim 1, wherein the mobile telecommunications device is one of:
- a telephone;
- a smart phone;
- a personal digital assistant;
- a handheld computer;
- a tablet computer; and
- a laptop computer.

7. The mobile telecommunications device of claim 1, wherein the generation of the output is initiated by at least one of:
- a selection of a mechanical button on the mobile telecommunications device;
- a selection of a virtual button on the mobile telecommunications device; and
- a selection of a menu item on the mobile telecommunications device.

8. A method, comprising:
- a mobile device making a light level measurement via a first light sensor, the light level measurement providing an indication of an amount of light incident on a subject, and the first light sensor being different from a second light sensor of a camera of the mobile device, the second light sensor configured to measure an amount of light reflected from the subject; and
- the mobile device simulating an incident light meter by generating a photography-related output based on the light level measurement made by the first light sensor, wherein the photography-related output is automatically applied to the camera to adjust an exposure setting, where the photography-related output is used for overriding an exposure setting of the camera which was automatically determined based on the amount of light reflected from the subject as measured by the second light sensor.

9. The method of claim 8, wherein the photography-related output is displayed on a display screen of the mobile device and is at least one of:
- a light level value displayed in a unit appropriate for photography; and
- an exposure setting.

10. The method of claim 8, wherein light level measurements made by the first light sensor are retrieved by a calculation component of the mobile device using a Java level application programming interface.

11. The method of claim 8, wherein the photography-related output is an exposure setting that is calculated based on the light level measurement and on at least one additional input that is manually entered into the mobile device and that is a setting for at least one of:
- a number of frames per second;
- a film sensitivity level;
- a shutter angle; and
- a lighting type.

12. The method of claim 11, wherein the lighting type is one of:
- daylight;
- tungsten; and
- fluorescent.

13. The method of claim 8, wherein the mobile device is one of:
- a telephone;
- a smart phone;
- a personal digital assistant;
- a handheld computer;
- a tablet computer; and
- a laptop computer.

14. The method of claim 8, wherein the generation of the output is initiated by at least one of:
- a selection of a mechanical button on the mobile device;
- a selection of a virtual button on the mobile device; and
- a selection of a menu item on the mobile device.

15. The mobile telecommunications device of claim 1, wherein the camera is configured to capture a photograph based on the photography-related output and not based on a measurement, by the first light sensor, of light reflected from the subject.

16. The mobile telecommunications device of claim 1, wherein adjustments to at least one of brightness of a display screen on the mobile telecommunications device and backlighting of a keypad on the mobile telecommunications device are based on light sensed by the second light sensor.

17. The method of claim 8, further comprising:
- capturing an image by the camera on the basis of the photography-related output and not on the basis of a measurement, by the second light sensor, of light reflected form the subject.

* * * * *

UNITED STATES PATENT AND TRADEMARK OFFICE
CERTIFICATE OF CORRECTION

| | | |
|---|---|---|
| PATENT NO. | : 8,937,675 B2 | Page 1 of 1 |
| APPLICATION NO. | : 13/035131 | |
| DATED | : January 20, 2015 | |
| INVENTOR(S) | : Rouzbeh Noori et al. | |

It is certified that error appears in the above-identified patent and that said Letters Patent is hereby corrected as shown below:

In The Claims

Claim 17, Column 8, Line 58 replace "form" with --from--

Signed and Sealed this
Twenty-sixth Day of January, 2016

Michelle K. Lee
*Director of the United States Patent and Trademark Office*